(12) United States Patent
Leigh et al.

(10) Patent No.: US 7,493,220 B2
(45) Date of Patent: Feb. 17, 2009

(54) METHOD AND SYSTEM FOR VIBRATION SIGNAL PROCESSING

(75) Inventors: Nigel Leigh, Christchurch (NZ); Carl Omundsen, Christchurch (NZ)

(73) Assignee: Commtest Instruments Limited, Christchurch (NZ)

( * ) Notice: Subject to any disclaimer, the term of this patent is extended or adjusted under 35 U.S.C. 154(b) by 0 days.

(21) Appl. No.: 11/726,680

(22) Filed: Mar. 22, 2007

(65) Prior Publication Data

US 2008/0234983 A1    Sep. 25, 2008

(51) Int. Cl.
- G06F 19/00 (2006.01)
- G06F 17/00 (2006.01)
- G06F 23/00 (2006.01)
- G01L 7/00 (2006.01)
- G01N 11/00 (2006.01)

(52) U.S. Cl. .............. 702/56; 702/33; 702/76; 73/602; 73/660; 701/111; 712/35; 181/207

(58) Field of Classification Search .......... 702/33–36, 702/56, 76, 104, 190; 73/660, 602; 701/111; 712/35; 181/207

See application file for complete search history.

(56) References Cited

U.S. PATENT DOCUMENTS 6,526,831 B2 * 3/2003 Ben-Romdhane ......... 73/660
6,668,234 B2 * 12/2003 DiTommaso et al. ....... 702/66

OTHER PUBLICATIONS

Shreve, 'Signal Processing for Effective Vibration Analysis', Nov. 1995, IRD Publication, pp. 1-11.*
McInerny et al., 'Basic Vibation Signal Processing for Bearing Fault Detection', Feb. 2003, IEEE Publication, vol. 46 No. 1, pp. 149-156.*

* cited by examiner

*Primary Examiner*—Edward Raymond
*Assistant Examiner*—Elias Desta
(74) *Attorney, Agent, or Firm*—Pitts & Brittian, P.C.

(57) ABSTRACT

The present invention relates to a vibration signal processing method and system that can be used to account for situations where impact or impulse events are hidden in a normal vibration reading by low frequency vibrations and high frequency noise. In one preferred form, the method of the present invention comprises the steps of obtaining electrical vibration signals that represent mechanical vibrations of a machine (102-106), converting the electrical vibration signals into digital vibration samples (108), dividing the digital vibration samples into equal time intervals and determining the average absolute amplitude of the digital vibration samples for each time interval (110), generating a time waveform comprising the determined average amplitudes (112, 114), and processing the time waveform as if it were an independently-detected signal (116-120).

14 Claims, 3 Drawing Sheets

METHOD AND SYSTEM FOR VIBRATION SIGNAL PROCESSING

FIELD OF THE INVENTION

The present invention relates to a method and system for vibration signal processing. In particular, but not exclusively, the present invention relates to a method and system for machine fault detection using a demodulation process to account for situations where impact or impulse events are hidden in a normal vibration reading.

BACKGROUND TO THE INVENTION

Demodulation is a vibration analysis process used to account for situations where certain machine problems remain hidden in a normal vibration reading, preventing early corrective action. Usually, these situations arise when the vibration is associated with an impact or impulse event. These events have a high frequency but a short duration. Unfortunately, when taking vibration readings, these vibration events are overwhelmed by the prominent long duration of low-frequency vibrations.

In use, demodulation first removes the low-frequency components of the vibration signals using a high-pass filter. To make the impulse events more prominent and easily identifiable later, the high-pass filtered signal is envelope-detected. The envelope-detected signal is then processed as if it were an independently-detected vibration signal. One disadvantage in demodulation is that, due to the number of filter stages, its digital implementation requires intensive signal processing.

Instead of envelope-detecting the high-pass filtered vibration signal, a technique known as PeakVue (disclosed in U.S. Pat. No. 5,895,857 to Robinson et al.) exists to extract the impulse events by signal processing the peaks of a detected vibration signal. The reference to the Robinson et al. patent and any other reference to patent specifications, external documents, or sources of information in this specification has been provided for the purpose of providing a context for discussing the features of the invention. Unless specifically stated otherwise, reference to such documents or sources of information is not to be construed as an admission that such documents or sources of information are prior art or form part of the common general knowledge in the art in any jurisdiction.

It is an object of the present invention to either provide a method and system that implements a demodulation type process, with a high signal-to-noise ratio (SNR), without intensive signal processing, or at least provide the public with a useful choice.

SUMMARY OF THE INVENTION

In one aspect, the present invention relates to a method of vibration signal processing comprising the steps of: obtaining electrical vibration signals having amplitudes and frequencies that represent mechanical vibrations of a machine; converting the electrical vibration signals into digital vibration samples; dividing the digital vibration samples into equal time intervals; determining the average absolute amplitude of the digital vibration samples for each time interval; generating a time waveform comprising the determined average amplitudes; and processing the time waveform as if it were an independently-detected signal.

In another aspect, the present invention relates to a method of vibration signal processing comprising the steps of: measuring the vibration level of a machine using one or more sensors to obtain electrical vibration signals; conditioning the electrical vibration signals; high pass filtering the electrical vibration signals; converting the high pass filtered electrical vibration signals into digital vibration samples; dividing the digital vibration samples into equal time intervals and, for each time interval, rectifying the digital vibration samples and determining the arithmetic mean or the root mean square (RMS) of the rectified digital vibration samples; buffering the mean digital vibration samples to create a time waveform representing the mean digital vibration samples; and processing the time waveform as if it were an independently-detected signal.

Preferably, the step of conditioning the electrical vibration signals comprises: buffering the electrical vibration signals; adjusting the gain of the buffered electrical vibration signals; and low-pass filtering the gain-adjusted electrical vibration signals.

Preferably, the step of high-pass filtering includes the step of selecting a lowest frequency of interest, $D_{min}$.

Preferably, the step of converting the electrical vibration signals into digital vibration samples includes the steps of:
  selecting the highest frequency of interest, $D_{max}$; and
  converting the filtered electrical vibration signals into digital vibration samples at a sampling rate of typically $D_{max} \times 2.56$.

Preferably, the step of dividing the digital vibration samples into equal time intervals includes the steps of:
  selecting a maximum fault frequency of interest, $DF_{max}$;
  dividing the digital vibration samples into equal time intervals, each having approximately $D_{max}/DF_{max}$ number of samples.

Preferably, the step of processing the time waveform comprises the steps of:
  windowing the time waveform;
  transforming the windowed time waveform into a frequency spectrum; and
  determining an average of the frequency spectrum.

In another aspect, the present invention relates to a system for vibration signal processing comprising: one or more vibration sensors to generate electrical vibration signals representing sensed vibrations; a conditioning circuit to condition the electrical vibration signals; a high-pass filter circuit; an analogue-to-digital converter (ADC) to convert the electrical vibration signals from the high-pass filter circuit into digital vibration samples; an averaging circuit configured to divide the digital vibration samples into equal time intervals, the averaging circuit including a rectifier to rectify the digital vibration samples in each time interval, and an averager to determine the arithmetic mean or the root mean square (RMS) of the rectified digital vibration samples in each time interval; and a buffer to receive the mean of the rectified digital vibration samples of each time interval, and to output the samples as a time waveform for further analysis.

Preferably, the averaging circuit and buffer are implemented in a processor.

Preferably, the processor is also configured to: window the time waveform; transform the windowed time waveform into a frequency spectrum; and determine an average of the frequency spectrum These steps could also be carried out as part of a second processing chain on another processor.

Preferably, the conditioning circuit comprises a buffer, a gain-adjuster, and a low-pass filter.

Preferably, the system includes an input means for a user to select a lowest frequency of interest ($D_{min}$) for the high-pass filter.

Preferably, the system includes an input means for a user to select the highest frequency of interest ($D_{max}$) for use in setting the sampling rate of the ADC at typically $D_{max} \times 2.56$.

Preferably, the system includes an input means for a user to select a maximum fault frequency of interest ($DF_{max}$) for use in setting each of the time intervals with a length of approximately $D_{max}/DF_{max}$.

The term 'comprising' as used in this specification means 'consisting at least in part of', that is to say when interpreting statements in this specification which include that term, the features, prefaced by that term in each statement, all need to be present but other features can also be present. Related terms such as 'comprise' and 'comprised' are to be interpreted in similar manner.

The present invention may also be said broadly to consist in the parts, elements and features referred to or indicated in the specification of the application, individually or collectively, and any or all combinations of any two or more said parts, elements or features. Where specific integers are mentioned herein which have known equivalents in the art to which this invention relates, such known equivalents are deemed to be incorporated herein as if individually set forth.

BRIEF DESCRIPTION OF THE FIGURES

Preferred forms of the method and system of the present invention will now be described with reference to the accompanying figures in which.

DETAILED DESCRIPTION OF THE PREFERRED FORMS

The present invention relates to vibration signal analysis that can be used to account for situations where impact or impulse events are hidden in a normal vibration reading by low-frequency vibrations and high-frequency noise. By applying the techniques of the present invention to a noisy vibration signal, an improved signal-to-noise ratio (SNR) can be obtained. This improved SNR makes spectral peaks of interest more easily distinguished from the noise floor, allowing earlier detection of a developing machine fault.

The Preferred Form System

Figure 1:
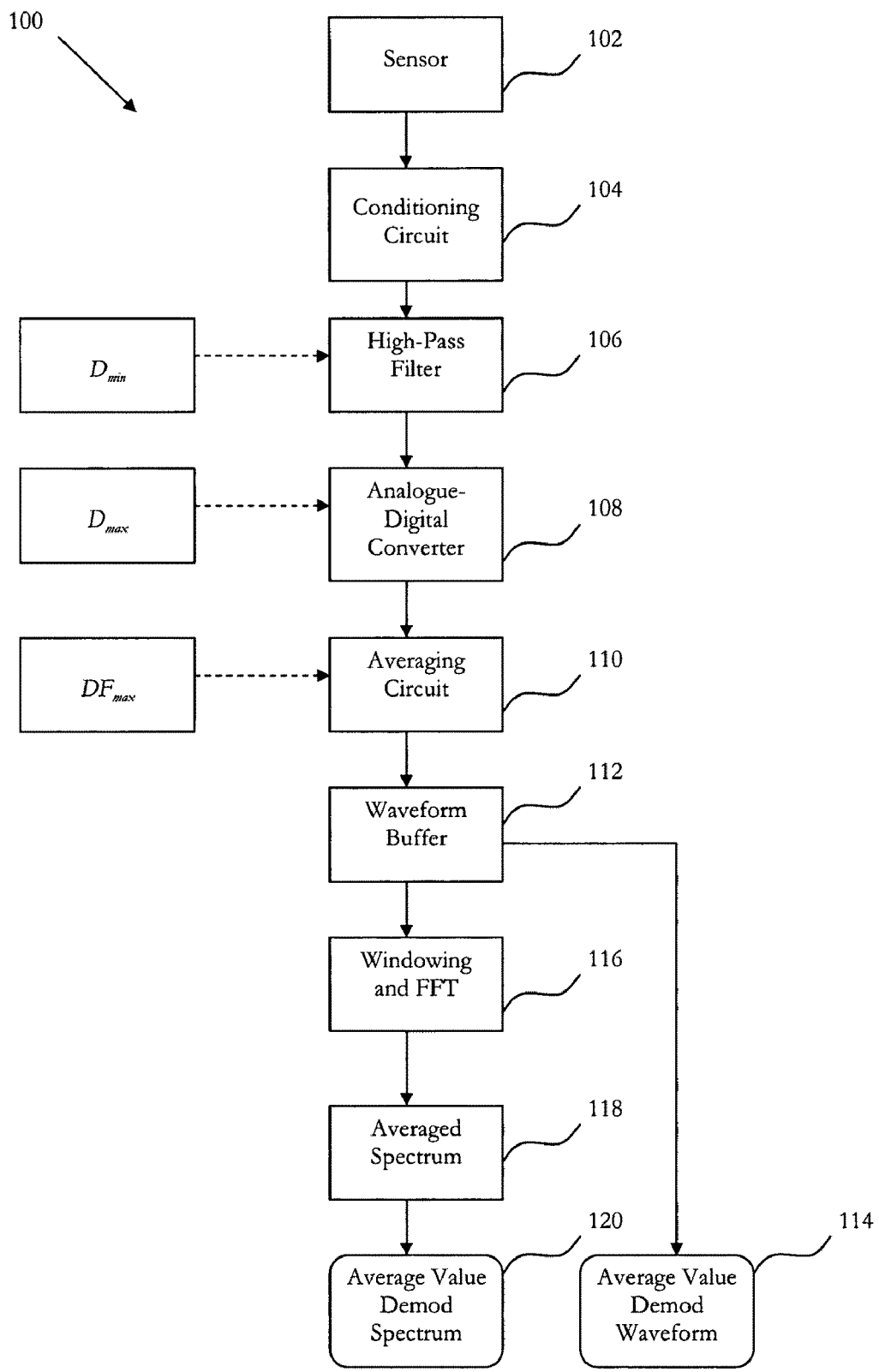
FIG. 1 shows a simplified processing chain of the system of the present invention.

Referring to FIG. 1, a simplified processing chain of the preferred form system is shown generally as 100. The system 100, which is used for vibration signal processing, includes one or more vibration sensors 102 to generate electrical vibration signals representing sensed mechanical vibrations. The sensor 102 is typically an accelerometer, but other sensors capable of sensing mechanical vibrations and representing them as electrical vibration signals could also be used.

Once the vibration signals are obtained, they are conditioned in a conditioning circuit 104. In the preferred form, the conditioning circuit 104 includes a buffer, amplifier and anti-alias filter (i.e. low-pass filter). After being conditioned, the signals are high-pass filtered at 106. This results in only those signals above a user-selected lowest frequency ($D_{min}$) being allowed to pass through the filter 106. The value for $D_{min}$ is preferably selected via an input means, which maybe one or more buttons, switches, knobs and the like, whether in hardware form or software form.

Skilled persons will appreciate that it is not essential to provide the high-pass filter 106 separately from the conditioning circuit 104. Where necessary or desired, the high-pass filter 106 may form part of the conditioning circuit, for instance, by combining the high-pass filter 106 with the low-pass filter of the conditioning circuit 104 such that band-pass filter is provided.

The signals that are output by the high-pass filter 106 are then sampled by an analogue-to-digital converter (ADC) 108 to produce digital vibration samples. In the preferred form, the user selects via an input means the highest frequency of interest ($D_{max}$), which is used to select the appropriate Nyquist sampling rate of typically $D_{max} \times 2.56$ for the ADC.

Once digital vibration samples are obtained, the samples are sent to an averaging circuit 110. The averaging circuit 110 divides or breaks the samples into equal time intervals. The number of samples in the interval will be approximately the ratio of the user-selected highest frequency of interest ($D_{max}$), and a user-selected maximum fault frequency of interest ($DF_{max}$):

$$\text{Samples in Interval} \approx D_{max}/DF_{max} \quad (1)$$

Although not shown, the averaging circuit 110 includes a rectifier to rectify the samples in each time interval. There is also an averager to determine the arithmetic mean or root mean square (RMS) of the rectified samples in each time interval. The determination of the arithmetic mean of the samples helps distinguish between signal peaks of interest and unwanted noise peaks. Once computed, the arithmetic mean values are saved into a waveform buffer 112. The buffer 112 collects the digital samples over a period and outputs the collected samples as a time waveform 114. The time waveform 114, which is made up of only the averaged values, is then processed as if it were an independently-detected vibration signal. For instance, the time waveform may be sent through a windowing and Fast Fourier Transform (FFT) process at 116 and an averaging process at 118 to produce a frequency spectrum of the vibration at 120.

Typically, the averaging circuit 110, waveform buffer 112, the processes of windowing and a Fast Fourier Transform (FFT) at 116 and averaging at 118 are performed using a microprocessor. To relieve the microprocessor of computations, the high-pass filter 106 is ideally implemented in analogue hardware. However, skilled persons will appreciate that the high-pass filter could also be implemented as a digital filter by the microprocessor.

The Preferred Form Method

In one preferred form, the method of the present invention begins with the step of obtaining electrical vibration signals having amplitudes and frequencies that represent mechanical vibrations of a machine. The signals are typically obtained directly from one or more sensors. In certain cases, however, the signals maybe obtained from a storage device that stores signals that were sensed previously.

The signals are high pass filtered and then divided into time intervals, each with an interval length set according to equation (1) noted earlier. For each interval, the method then determines the average absolute (rectified) amplitude of the digital vibration samples. The average amplitude of each interval is then used to generate a time waveform such that the waveform comprises the determined average amplitudes. This time waveform can then be processed as if it were an independently-detected signal.

In another form, the above preferred method may include the step of conditioning the electrical vibration signals that are obtained using vibration sensors. This step may comprise: (i) buffering the electrical vibration signals, (ii) adjusting the gain of the signals, and (iii) low-pass filtering the signals for anti-aliasing.

EXAMPLE

Figure 2A:
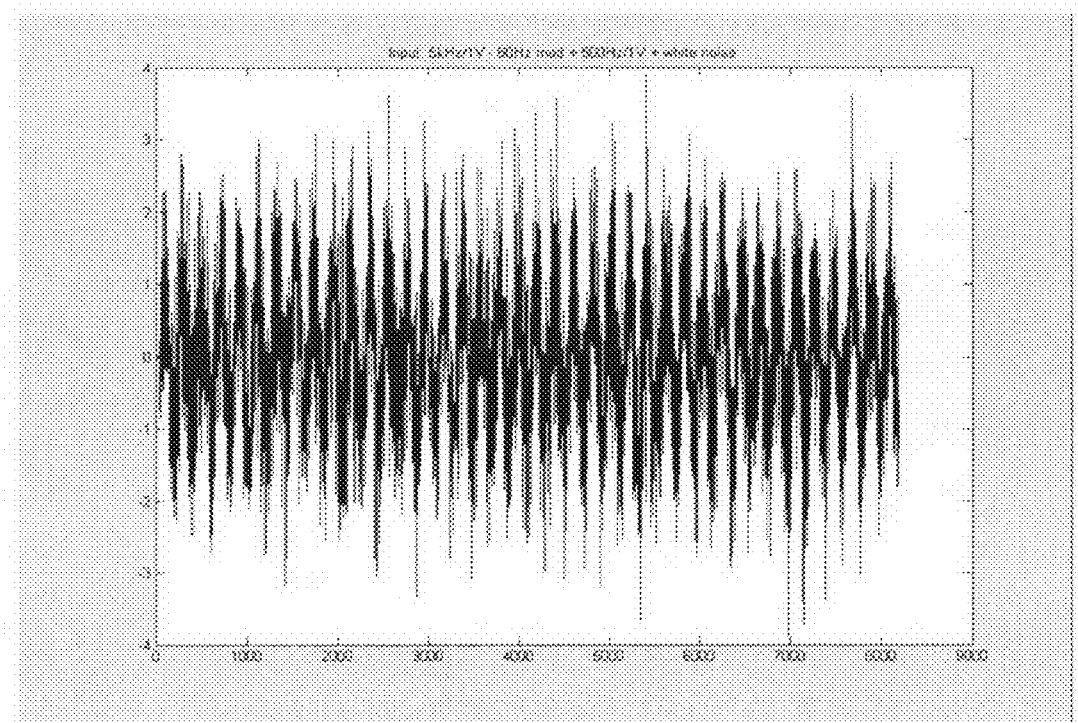
FIG. 2A shows a worst-case type of test signal used for testing some of the prior techniques and that of the present invention.

The above method of the present invention was simulated and compared against a classic demodulation process and the prior art PeakVue process. The simulation was based on a worst-case type of test signal, shown in FIG. 2A. Specifically, the signal included a 1V low-frequency noise at 500 Hz 1 dB white noise and a simulated 60 Hz impact signal. The simulated impact signal was a 1V, 5 kHz sinusoid passed through a Blackman-Harris window with a duration of 5 ms.

Figure 2B:
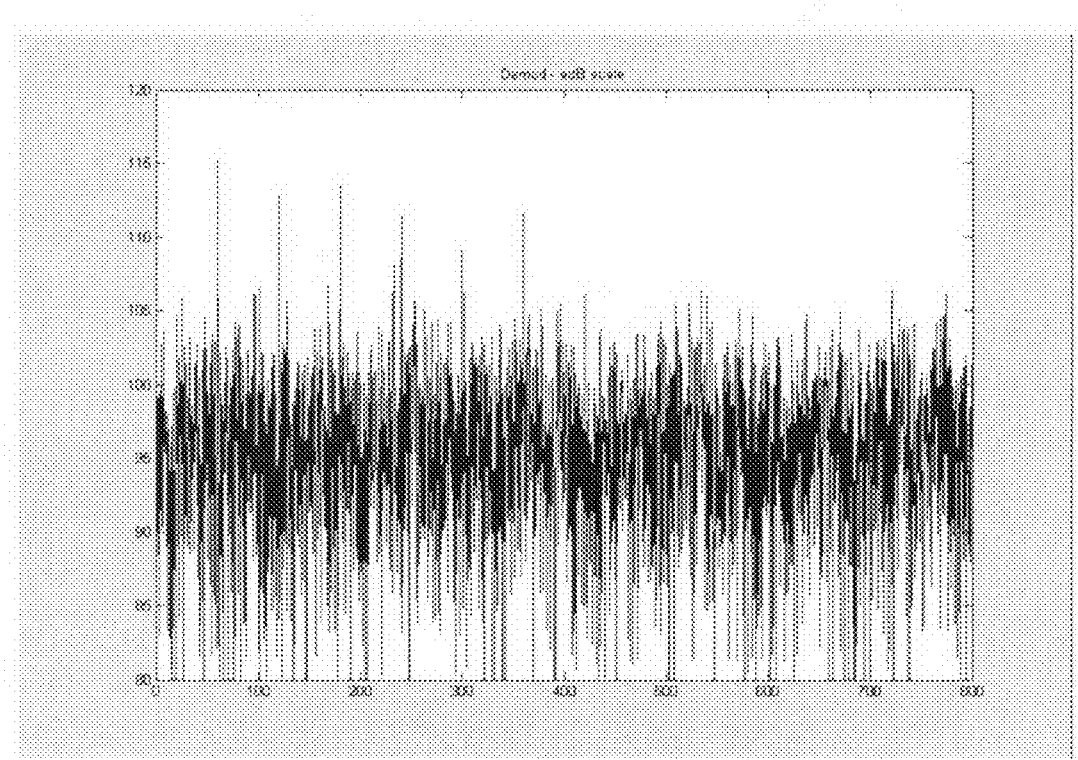
FIG. 2B shows the results of a prior art demodulation process carried out on the test signal of FIG. 2A.
Figure 2C:
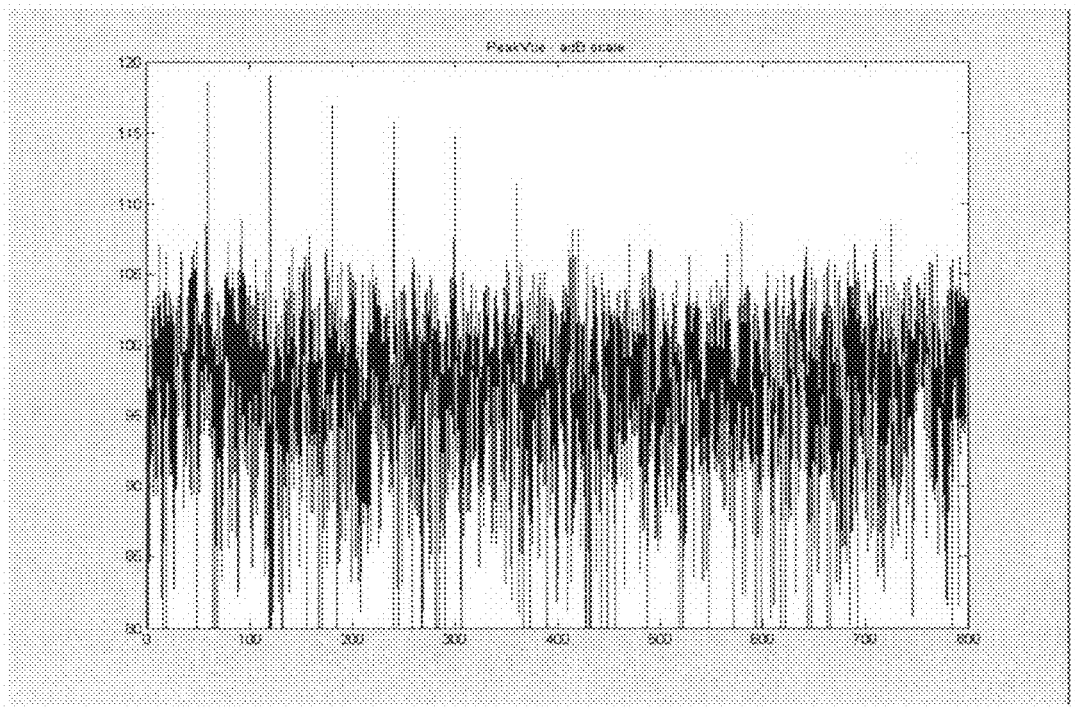
FIG. 2C shows the results of another prior art demodulation process carried out on the test signal of FIG. 2A.
Figure 2D:
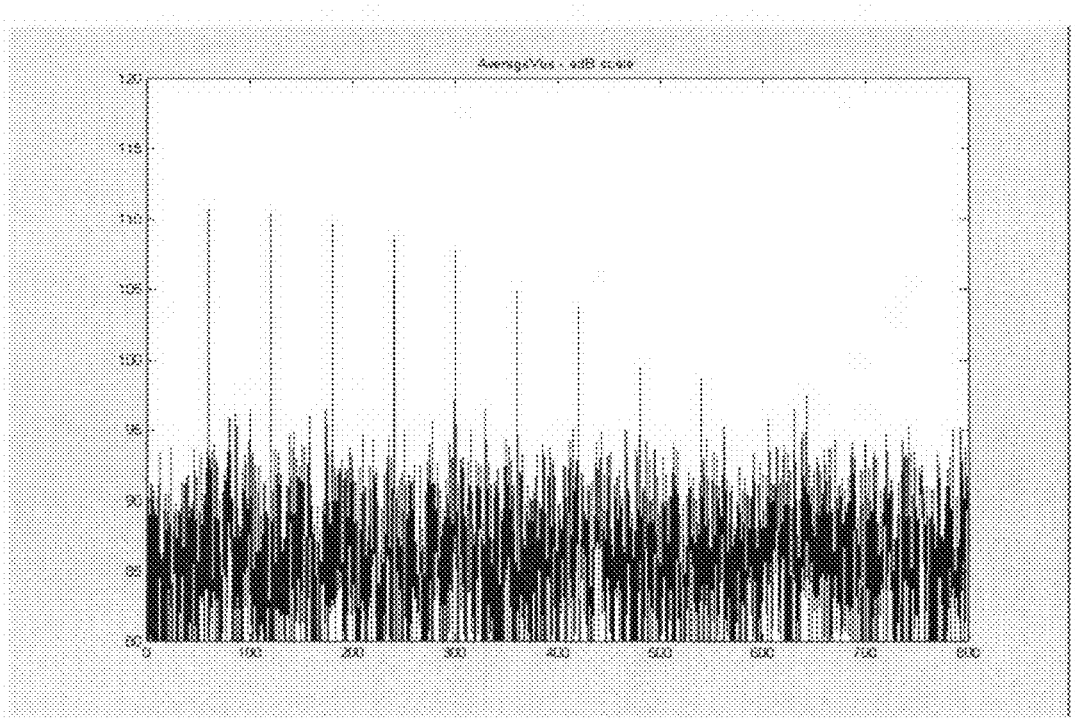
FIG. 2D shows the results of applying the technique of the present invention to the test signal of FIG. 2A.

The result of classic demodulation is shown in FIG. 2B, the result of PeakVue processing is shown in FIG. 2C and the result of the method of the present invention is shown in FIG. 2D. Although all processes picked up the 60 Hz impacting signal, the method of the present invention provided the best SNR of ~15 dB, compared to PeakVue's 12 dB and classic demodulation's 10dB SNR.

The foregoing describes the invention including preferred forms thereof. Alterations and modifications as will be obvious to those skilled in the art are intended to be incorporated within the scope hereof, as defined by the accompanying claims.

The invention claimed is:

1. A method of vibration signal processing comprising the steps of:
   obtaining electrical vibration signals having amplitudes and frequencies that represent mechanical vibrations of a machine;
   converting the electrical vibration signals into digital vibration samples;
   dividing the digital vibration samples into equal time intervals;
   determining the average absolute amplitude of the digital vibration samples for each time interval;
   generating a time waveform comprising the determined average amplitudes; and
   processing the time waveform as if it were an independently-detected signal.

2. A method of vibration signal processing comprising the steps of:
   measuring the vibration of a machine using one or more sensors to obtain electrical vibration signals;
   conditioning the electrical vibration signals;
   high-pass filtering the conditioned signals;
   converting the high-pass filtered electrical vibration signals into digital vibration samples;
   dividing the digital vibration samples into equal time intervals and, for each time interval, rectifying the digital vibration samples and determining the arithmetic mean of the rectified digital vibration samples;
   buffering the mean digital vibration samples to create a time waveform representing the mean digital vibration samples; and
   processing the time waveform as if it were an independently-detected signal.

3. The method as claimed in claim 2, wherein the step of conditioning the electrical vibration signals comprises:
   buffering the electrical vibration signals;
   adjusting the gain of the buffered electrical vibration signals; and
   low-pass filtering the gain-adjusted electrical vibration signals.

4. The method as claimed in claim 2, wherein the step of high-pass filtering includes the step of selecting a lowest frequency of interest, $D_{min}$.

5. The method as claimed in claim 2, wherein the step of converting the electrical vibration signals into digital vibration samples includes the steps of:
   selecting the highest frequency of interest, $D_{max}$; and
   converting the electrical vibration signals into digital vibration samples at a sampling rate of typically $D_{max} \times 2.56$.

6. The method as claimed in claim 5, wherein the step of dividing the digital vibration samples into equal time intervals includes the steps of:
   selecting a maximum fault frequency of interest, $DF_{max}$;
   dividing the digital vibration samples into equal time intervals, each having approximately $D_{max}/DF_{max}$ number of samples.

7. The method as claimed in claim 2, wherein the step of processing the time waveform comprises the steps of:
   windowing the time waveform;
   transforming the windowed time waveform into a frequency spectrum; and
   determining an average of the frequency spectrum.

8. A system for vibration signal processing comprising:
   one or more vibration sensors to generate electrical vibration signals representing sensed mechanical vibrations;
   a conditioning circuit to condition the electrical vibration signals;
   a high-pass filter circuit;
   an analogue-to-digital converter (ADC) to convert the high-pass filtered electrical vibration signals into digital vibration samples;
   an averaging circuit configured to divide the digital vibration samples into equal time intervals, the averaging circuit including a rectifier to rectify the digital vibration samples in each time interval, and an averager to determine the arithmetic mean or root mean square (RMS) of the rectified digital vibration samples in each time interval; and
   a buffer to receive the mean of the rectified digital vibration samples of each time interval, and to output the samples as a time waveform for further analysis.

9. The system as claimed in claim 8, wherein the averaging circuit and buffer are implemented in a processor.

10. The system as claimed in claim 8, wherein the processor is also configured to:
    window the time waveform;
    transforming the windowed time waveform into a frequency spectrum; and
    determining an average of the frequency spectrum.

11. The system as claimed in claim 8, wherein the conditioning circuit comprises a buffer, an amplifier, a low-pass filter and a high-pass filter.

12. The system as claimed in claim 8, wherein the system includes an input means for a user to select a lowest frequency of interest ($D_{min}$) for the high-pass filter.

13. The system as claimed in any one of claim 8, wherein the system includes an input means for a user to select the highest frequency of interest ($D_{max}$) for use in setting the sampling rate of the ADC at typically $D_{max} \times 2.56$.

14. The system as claimed in claim 13, wherein the system includes an input means for a user to select a maximum fault frequency of interest ($DF_{max}$) for use in setting each of the time intervals with a length in samples of approximately $D_{max}/DF_{max}$.

* * * * *